United States Patent
Huang et al.

(10) Patent No.: US 11,429,242 B2
(45) Date of Patent: Aug. 30, 2022

(54) TOUCH DISPLAY APPARATUS

(71) Applicant: Au Optronics Corporation, Hsinchu (TW)

(72) Inventors: Kuo-Hsuan Huang, Hsinchu (TW); Chieh-Ming Chen, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 17/494,832

(22) Filed: Oct. 6, 2021

(65) Prior Publication Data

US 2022/0147171 A1 May 12, 2022

Related U.S. Application Data

(60) Provisional application No. 63/110,422, filed on Nov. 6, 2020.

(30) Foreign Application Priority Data

Apr. 15, 2021 (TW) .................................. 110113591

(51) Int. Cl.
G06F 3/047 (2006.01)
G06F 3/041 (2006.01)

(52) U.S. Cl.
CPC ............ G06F 3/047 (2013.01); G06F 3/0412 (2013.01); *G06F 2203/04112* (2013.01)

(58) Field of Classification Search
CPC .......... G06F 3/047; G06F 2203/04112; H01L 27/323
See application file for complete search history.

(56) References Cited

U.S. PATENT DOCUMENTS 8,896,573 B1 11/2014 Guard
2014/0118635 A1 5/2014 Yang

FOREIGN PATENT DOCUMENTS

CN 104380225 2/2015
CN 104137040 3/2018

*Primary Examiner* — Sanjiv D. Patel
(74) *Attorney, Agent, or Firm* — JCIPRNET

(57) ABSTRACT

A touch display apparatus including a display panel and a plurality of touch electrodes is provided. The touch electrodes overlap the display panel and have a plurality of wire segments that intersect each other. A first spacing SP1 between any adjacent two of the wire segments arranged along a first direction satisfies a relationship below:

$$0.98 \times \left(\frac{25400}{PPI \times (B/N)}\right) \leq SP1 \leq 1.02 \times \left(\frac{25400}{PPI \times (B/N)}\right),$$

where PPI is the number of pixels per inch of the display panel, B is 1.8 or 2.1, and N is 1 or a positive even number.

16 Claims, 6 Drawing Sheets

TOUCH DISPLAY APPARATUS

CROSS-REFERENCE TO RELATED APPLICATION

This application claims the priority benefits of U.S. provisional application Ser. No. 63/110,422, filed on Nov. 6, 2020 and Taiwanese application no. 110113591, filed on Apr. 15, 2021. The entirety of each of the above-mentioned patent applications is hereby incorporated by reference herein and made a part of this specification.

BACKGROUND

Technical Field

The disclosure relates to a display apparatus, and in particular, to a touch display apparatus.

Description of Related Art

In recent years, people's reliance on electronic products has been increasing one day after another. To achieve greater convenience, more lightweight sizes, and greater user-friendliness, input devices in many information products have been transformed from conventional keyboards or mice into touch panels. Among them, a display panel with touch function has become the standard equipment of today's mobile devices. Due to fast response, good reliability, and high durability, capacitive touch technology has become the current mainstream touch technology and is widely adopted in related electronic products (e.g., mobile phones, tablet computers, or smart watches). According to the integration between the touch technology and the display panel, capacitive touch display apparatuses can generally be divided into three modes, i.e., an out-cell mode, an on-cell mode, and an in-cell mode.

Generally speaking, in the out-cell mode or on-cell mode touch display apparatus, a touch electrode layer may be disposed on the side of the display panel close to a user, such that the touch electrode can better sense touch by the user. To increase the transmission speed (or sensing frequency) of a sensing signal, metal materials are mostly adopted for the touch electrode layer. However, moiré patterns are likely to be generated by electrode patterns (e.g., metal mesh-shaped electrodes) of the touch electrode layer and a light-shielding structure of the display panel in the line of sight direction, reducing the display quality of the touch display apparatus.

SUMMARY

The disclosure provides a touch display apparatus with better display quality.

A touch display apparatus of the disclosure includes a display panel and a plurality of touch electrodes. The touch electrodes overlap the display panel and have a plurality of wire segments that intersect each other. A first spacing SP1 between any adjacent two of the wire segments arranged along a first direction satisfies a relationship below:

$$0.98 \times \left(\frac{25400}{PPI \times (B/N)}\right) \leq SP1 \leq 1.02 \times \left(\frac{25400}{PPI \times (B/N)}\right),$$

where PPI is the number of pixels per inch of the display panel, B is 1.8 or 2.1, and N is 1 or a positive even number.

In an embodiment of the disclosure, in the touch display apparatus, a second spacing SP2 between any adjacent two of the wire segments arranged along a second direction satisfies a relationship below:

$$0.98 \times \left(\frac{25400}{PPI \times (B/N)}\right) \leq SP2 \leq 1.02 \times \left(\frac{25400}{PPI \times (B/N)}\right),$$

where the first direction intersects the second direction.

In an embodiment of the disclosure, in the touch display apparatus, the first spacing SP1 is equal to the second spacing SP2.

In an embodiment of the disclosure, the touch electrodes of the touch display apparatus include a plurality of first touch electrodes and a plurality of second touch electrodes. The first touch electrodes have a plurality of first wire segments and a plurality of second wire segments that intersect each other. The second touch electrodes have a plurality of third wire segments and a plurality of fourth wire segments that intersect each other. The first wire segments and the third wire segments are alternately arranged at the first spacing SP1 along the first direction. The second wire segments and the fourth wire segments are alternately arranged at a second spacing SP2 along a second direction. The first direction intersects the second direction. The second spacing SP2 satisfies a relationship below:

$$0.98 \times \left(\frac{25400}{PPI \times (B/N)}\right) \leq SP2 \leq 1.02 \times \left(\frac{25400}{PPI \times (B/N)}\right).$$

In an embodiment of the disclosure, the display panel of the touch display apparatus includes a light shielding structure layer. The light shielding structure layer has a plurality of first extension segments and a plurality of second extension segments that intersect each other. An angle between an extension direction of each of the wire segments of the touch electrodes and an extension direction of the first extension segments or an extension direction of the second extension segments is in a range between 25 degrees and 65 degrees.

In an embodiment of the disclosure, in the touch display apparatus, a line width of each of the wire segments is greater than 4 micrometers.

In an embodiment of the disclosure, in the touch display apparatus, B/N is equal to 2.10, 1.80, 1.05, 0.90, 0.525, or 0.45.

In an embodiment of the disclosure, the touch display apparatus further includes a plurality of dummy electrodes. The dummy electrodes overlap the display panel and are electrically insulated from the touch electrodes. The dummy electrodes have a plurality of dummy wire segments that intersect each other. Part of the dummy wire segments are arranged at the first spacing SP1 along the first direction.

A touch display apparatus of the disclosure includes a display panel, a plurality of touch electrodes, and a protective layer. The display panel is adapted to be viewed by a user at a viewing angle θ1 and at a viewing distance D. The display panel includes a substrate and a light shielding structure layer. The substrate has a first side and a second side opposite to each other. The light shielding structure layer is disposed on the first side of the substrate. The touch electrodes are disposed on the second side of the substrate and overlap the light shielding structure layer. The touch electrodes have a plurality of wire segments that intersect each other. The protective layer is disposed on the second side of the substrate and covers the touch electrodes and the substrate. A first spacing SP1 between any adjacent two of the wire segments arranged along a first direction satisfies a relationship below:

$$0.98 \times \left(\frac{25400}{PPI \times (B/N)} + \Delta p\right) \leq SP1 \leq 1.02 \times \left(\frac{25400}{PPI \times (B/N)} + \Delta p\right),$$

$$\Delta p = t \times \left\{\tan\left[\sin^{-1}\left(\frac{n1 \times \sin\theta 1}{n2}\right)\right] - \tan\left[\sin^{-1}\left(\frac{n1}{n2} \times \sin\left(\tan^{-1}\left(\frac{D}{D/\tan\theta 1 + 25400/(PPI \times B/N)}\right)\right)\right)\right]\right\},$$

where t is a thickness of the substrate, n1 is a refractive index of the protective layer, n2 is a refractive index of the substrate, PPI is a number of pixels per inch of the display panel, B is 1.8 or 2.1, and N is 1 or a positive even number.

In an embodiment of the disclosure, in the touch display apparatus, a second spacing SP2 between any adjacent two of the wire segments arranged along a second direction satisfies a relationship below:

$$0.98 \times \left(\frac{25400}{PPI \times (B/N)} + \Delta p\right) \leq SP2 \leq 1.02 \times \left(\frac{25400}{PPI \times (B/N)} + \Delta p\right),$$

where the first direction intersects the second direction.

In an embodiment of the disclosure, in the touch display apparatus, the first spacing SP1 is equal to the second spacing SP2.

In an embodiment of the disclosure, the touch electrodes of the touch display apparatus include a plurality of first touch electrodes and a plurality of second touch electrodes. The first touch electrodes have a plurality of first wire segments and a plurality of second wire segments that intersect each other. The second touch electrodes have a plurality of third wire segments and a plurality of fourth wire segments that intersect each other. The first wire segments and the third wire segments are alternately arranged at the first spacing SP1 along the first direction. The second wire segments and the fourth wire segments are alternately arranged at a second spacing SP2 along a second direction. The first direction intersects the second direction. The second spacing SP2 satisfies a relationship below:

$$0.98 \times \left(\frac{25400}{PPI \times (B/N)} + \Delta p\right) \leq SP2 \leq 1.02 \times \left(\frac{25400}{PPI \times (B/N)} + \Delta p\right).$$

In an embodiment of the disclosure, the light shielding structure layer of the touch display apparatus has a plurality of first extension segments and a plurality of second extension segments that intersect each other. An angle between an extension direction of each of the wire segments of the touch electrodes and an extension direction of the first extension segments or an extension direction of the second extension segments is in a range between 25 degrees and 65 degrees.

In an embodiment of the disclosure, in the touch display apparatus, a line width of each of the wire segments is greater than 4 micrometers.

In an embodiment of the disclosure, in the touch display apparatus, B/N is equal to 2.10, 1.80, 1.05, 0.90, 0.525, or 0.45.

In an embodiment of the disclosure, the touch display apparatus further includes a plurality of dummy electrodes. The dummy electrodes overlap the display panel and are electrically insulated from the touch electrodes. The dummy electrodes have a plurality of dummy wire segments that intersect each other. Part of the dummy wire segments are arranged at the first spacing SP1 along the first direction.

Based on the foregoing, in the touch display apparatus according to an embodiment of the disclosure, a part of the wire segments of the touch electrodes are arranged at a specific spacing $$0.98 \times \left(\frac{25400}{PPI \times (B/N)}\right) \text{ to } 1.02 \times \left(\frac{25400}{PPI \times (B/N)}\right),$$

along a direction. By setting the specific spacing in the range of occurrences of moiré patterns when the touch electrodes overlap the display panel can be effectively suppressed, thereby improving the display quality of the touch display apparatus, where PPI is the number of pixels per inch of the display panel, B is 1.8 or 2.1, and N is 1 or a positive even number. In addition, by setting the specific spacing in the range of $$0.98 \times \left(\frac{25400}{PPI \times (B/N)} + \Delta p\right) \text{ to } 1.02 \times \left(\frac{25400}{PPI \times (B/N)} + \Delta p\right),$$

deterioration of the moiré patterns when being viewed at a great viewing angle and a short viewing distance can be improved, where Δp is a compensation value having dependence on the viewing angle and the viewing distance.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
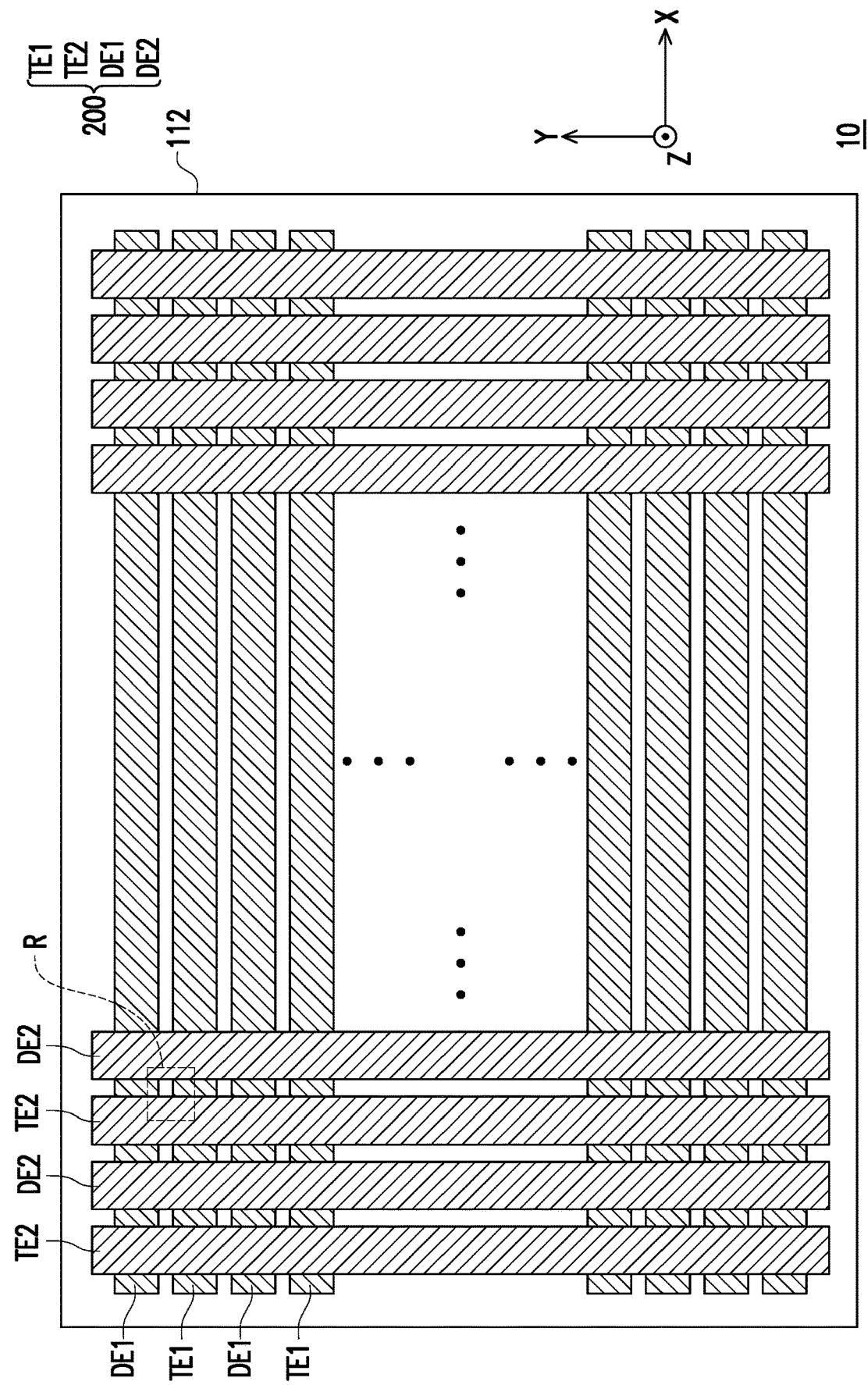
FIG. 1 is a schematic top view of a touch display apparatus according to an embodiment of the disclosure.

The term "about", "similar", "essentially", or "substantially" as used herein is inclusive of the stated value and means within an acceptable range of deviation for the particular value as determined by people having ordinary skill in the art, considering the measurement in question and the error associated with measurement of the particular quantity (i.e., the limitations of the measurement system). For instance, "about" may mean within one or more standard deviations or, for instance, ±30%, ±20%, ±10%, or ±5% of the stated value. Furthermore, a relatively acceptable range of deviation or standard deviation may be chosen for the term "about", "similar", "essentially", or "substantially" as used herein based on measurement properties, cutting properties, or other properties, instead of applying one standard deviation across all the properties.

In the drawings, thicknesses of layers, films, panels, regions, etc., are exaggerated for the sake of clarity. It should be understood that when a device such as a layer, film, region, or substrate is referred to as being "on", or "connected to" another device, it may be directly on or connected to another device, or intervening devices may also be present. In contrast, when a device is referred to as being "directly on" or "directly connected to" another device, no intervening devices are present. As used herein, the term "connection" may refer to physical connection and/or electrical connection. Furthermore, "electrically connection" may encompass the presence of other devices between two devices.

Reference will now be made in detail to exemplary embodiments of the disclosure, examples of which are illustrated in the accompanying drawings. Wherever possible, the same reference numerals are used in the drawings and descriptions to denote the same or similar parts.

Figure 2:
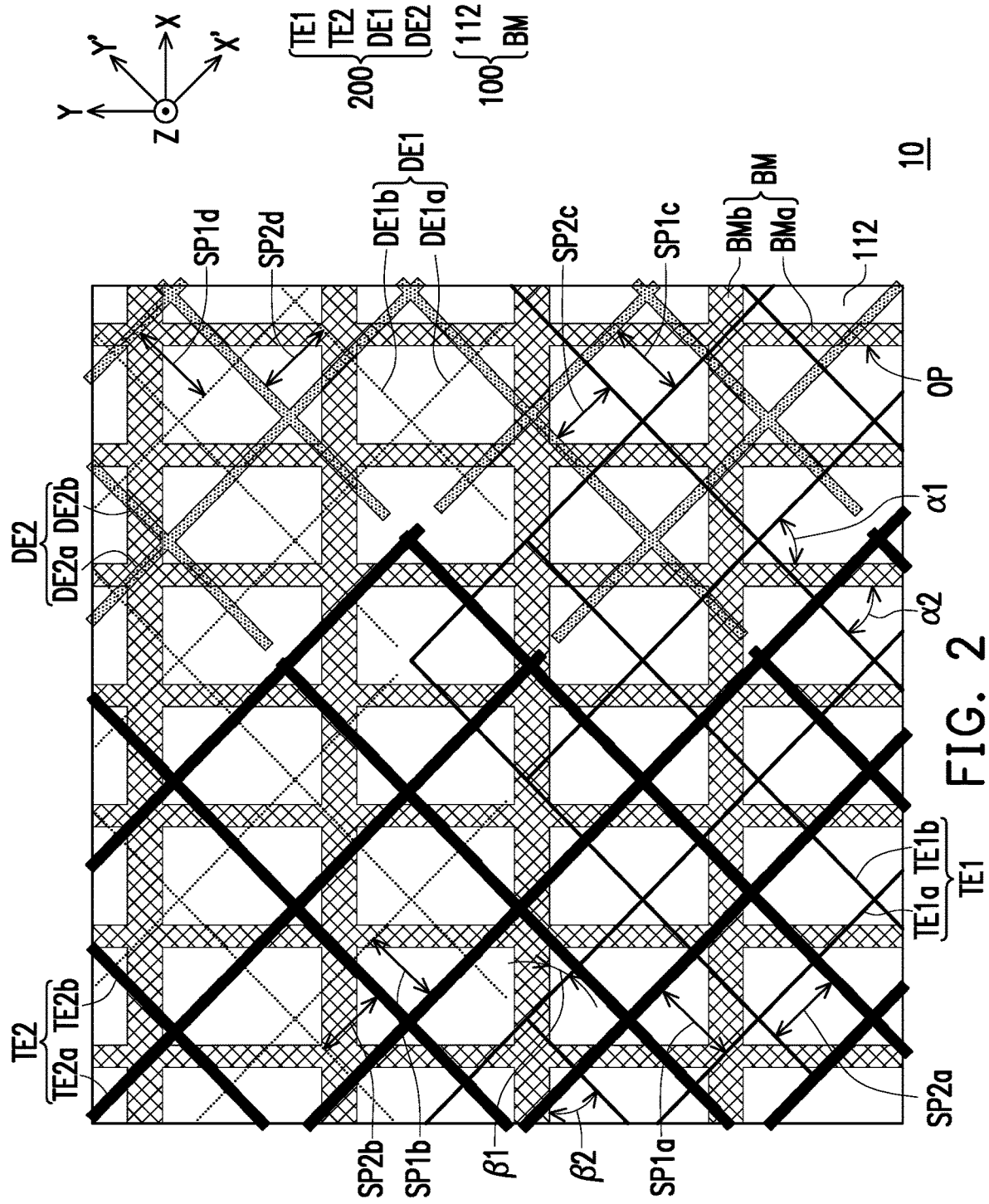
FIG. 2 is an enlarged view of a partial region of the touch display apparatus of FIG. 1.
Figure 3:
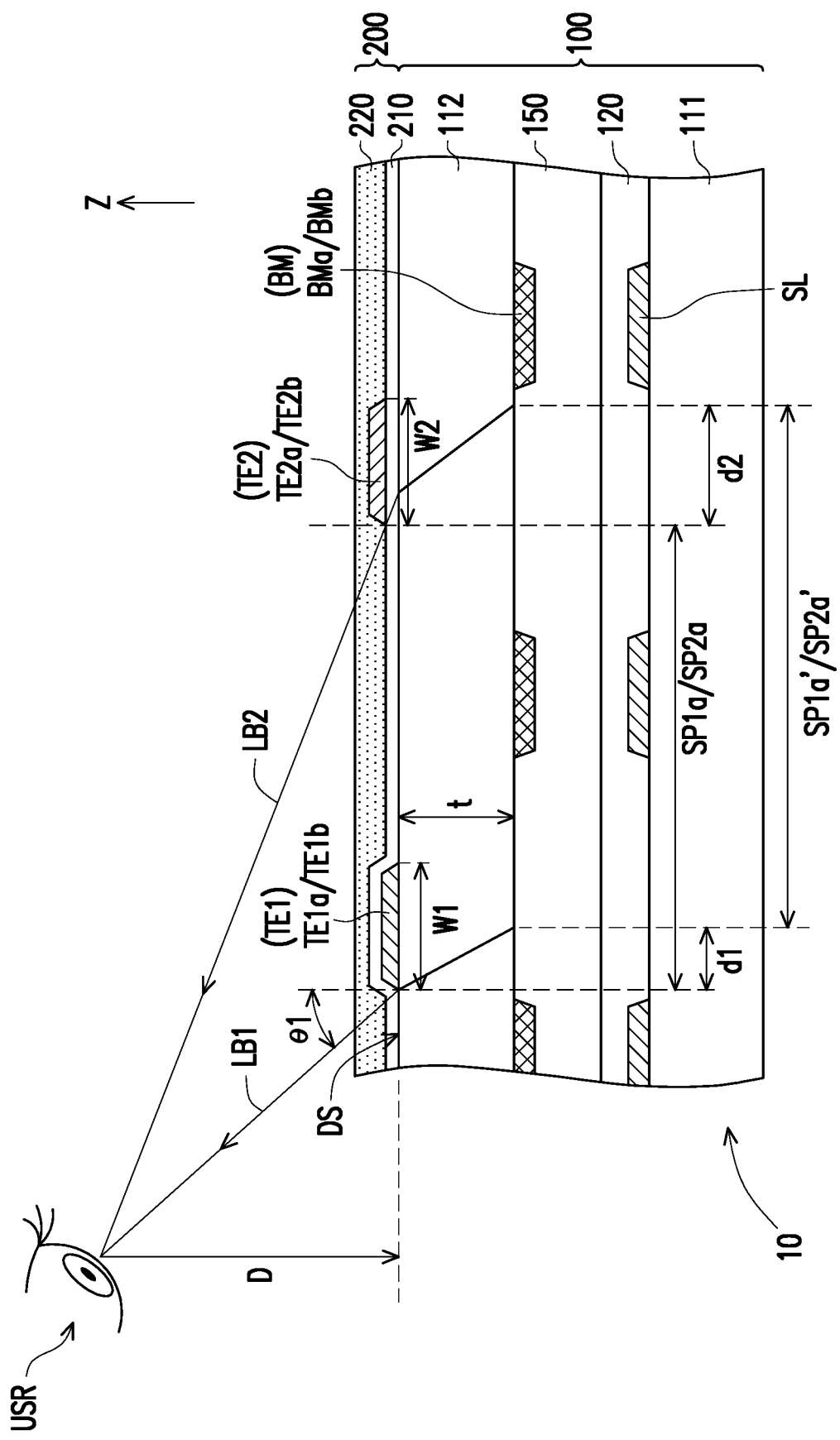
FIG. 3 is a schematic cross-sectional view of the touch display apparatus of FIG. 2.
Figure 4:
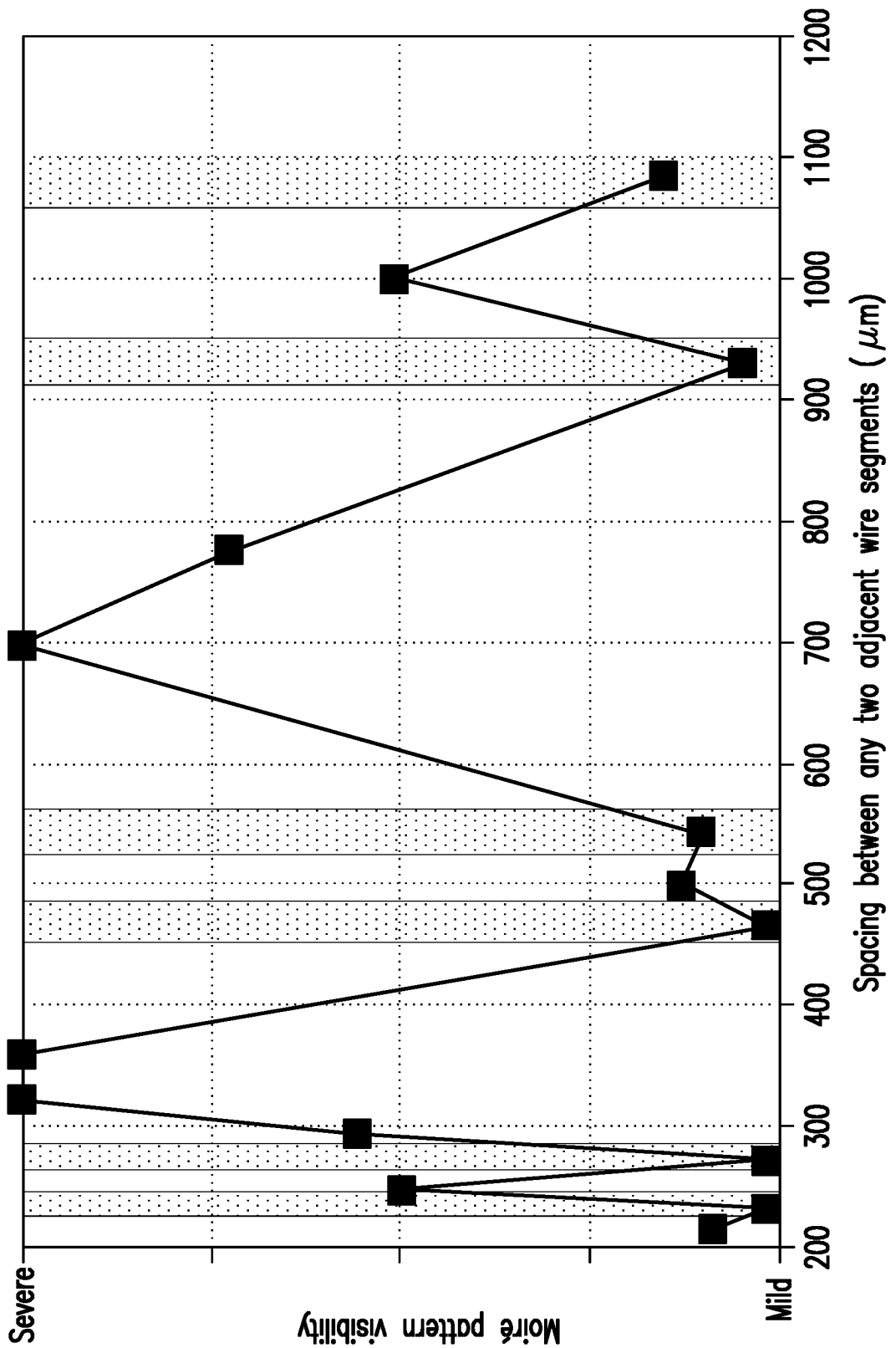
FIG. 4 is a distribution graph of moiré pattern visibility of the touch display apparatus of FIG. 1 vs. spacing between any two adjacent wire segments.
Figure 5:
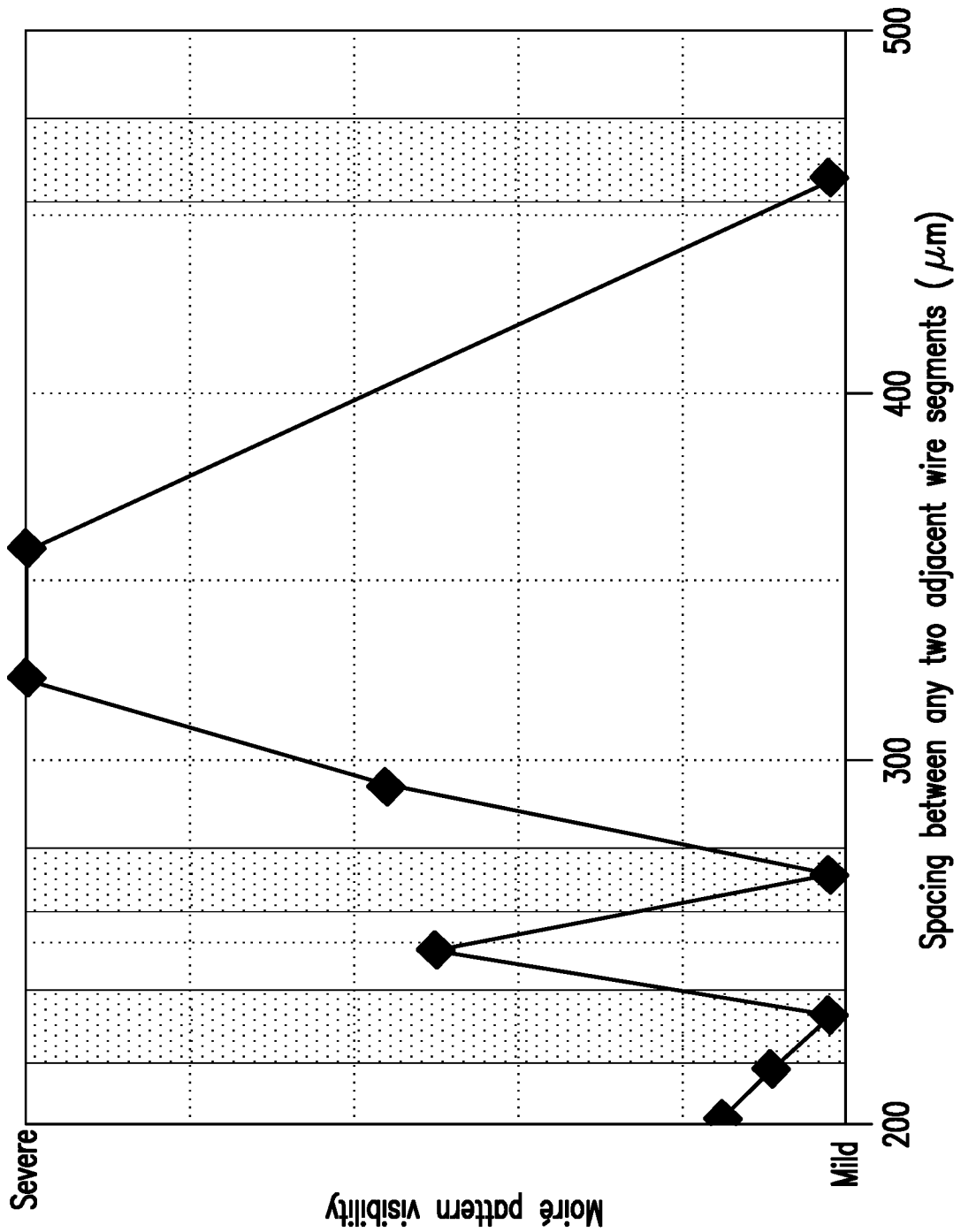
FIG. 5 is a distribution graph of moiré pattern visibility of a touch display apparatus according to another embodiment of the disclosure vs. spacing between any two adjacent wire segments.
Figure 6:
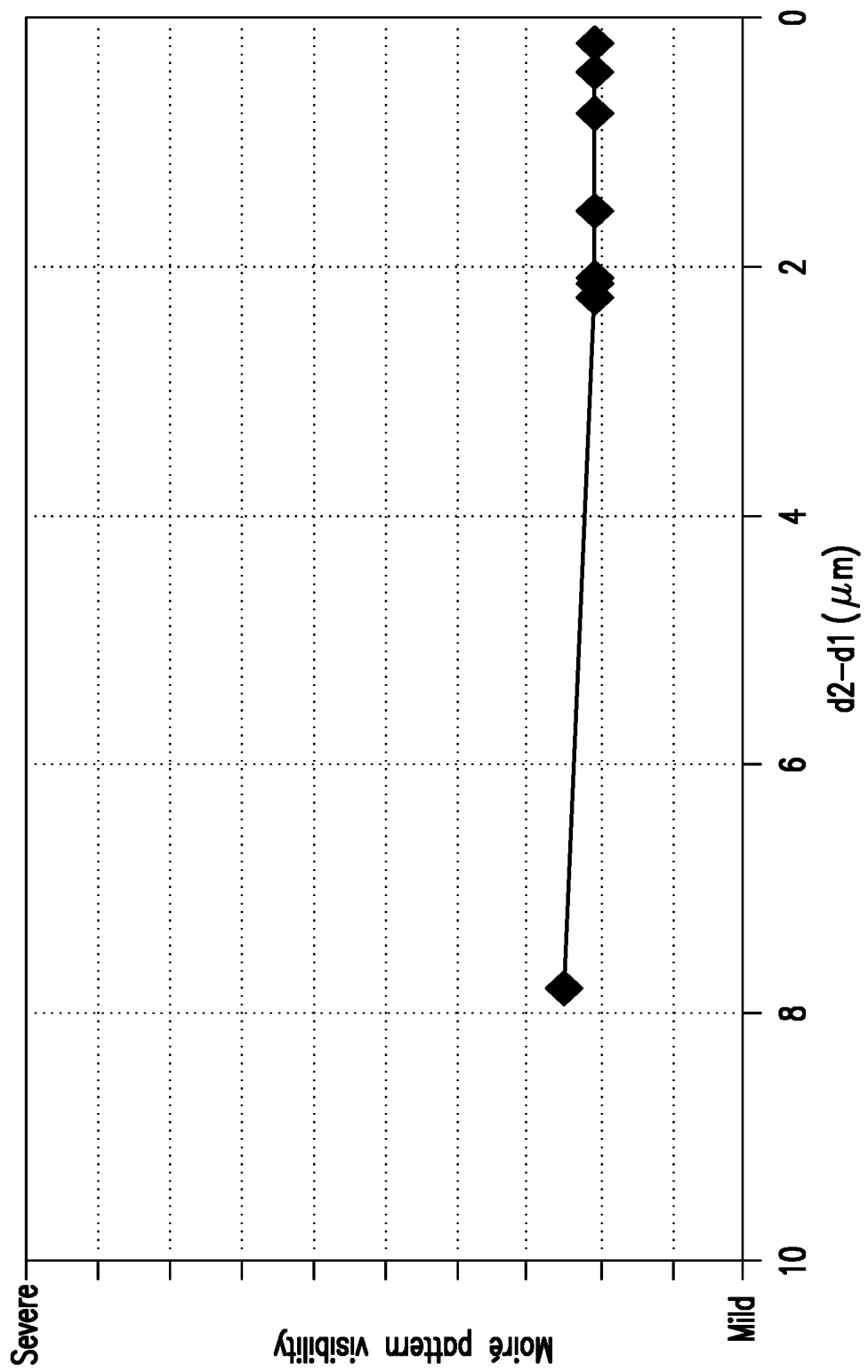
FIG. 6 is a distribution graph of moiré pattern visibility of the touch display apparatus of FIG. 1 vs. different viewing angles and different viewing distances.

FIG. 1 is a schematic top view of a touch display apparatus according to an embodiment of the disclosure. FIG. 2 is an enlarged view of a partial region R of the touch display apparatus of FIG. 1. FIG. 3 is a schematic cross-sectional view of the touch display apparatus of FIG. 2. FIG. 4 is a distribution graph of moiré pattern visibility of the touch display apparatus of FIG. 1 vs. spacing between any two adjacent wire segments. FIG. 5 is a distribution graph of moiré pattern visibility of a touch display apparatus according to another embodiment of the disclosure vs. spacing between any two adjacent wire segments. FIG. 6 is a distribution graph of moiré pattern visibility of the touch display apparatus of FIG. 1 vs. different viewing angles and different viewing distances.

For clarity of presentation, FIG. 1 only shows the touch sensing layer 200 and the second substrate 112 of FIG. 3, and FIG. 2 only shows the touch sensing layer 200, the second substrate 112, and the black matrix BM of FIG. 3. In addition, to clearly represent different layers of metal conductive layers of FIG. 2, wire segments of the first touch electrode TE1 and the first dummy electrode DE1 are drawn with lines in different thicknesses from wire segments of the second touch electrode TE2 and the second dummy electrode DE2, and it is not intended that the actual widths of the electrodes is limited to the disclosure of the drawings. For example, in this embodiment, the respective line widths of the wire segments of the electrodes are approximately the same, but not limited thereto.

With reference to FIG. 1 to FIG. 3, a touch display apparatus 10 includes a display panel 100 and a touch sensing layer 200 overlapping each other. In this embodiment, the touch sensing layer 200 is disposed on the side of a display surface DS of the display panel 100. In other words, the touch display apparatus 10 is, for example but not limited to, an on-cell mode touch display apparatus. In other embodiments, the touch display apparatus may also be an out-cell mode touch display apparatus.

In this embodiment, the display panel 100 includes a first substrate 111, a second substrate 112, a pixel circuit layer 120, a display medium layer 150, and a black matrix BM. The display medium layer 150 is disposed between the first substrate 111 and the second substrate 112. The pixel circuit layer 120 is disposed between the first substrate 111 and the display medium layer 150. The black matrix BM is disposed between the display medium layer 150 and the second substrate 112. The materials of the first substrate 111 and the second substrate 112 may include glass, quartz, polymer, or other suitable light-transmitting base materials. The display medium layer 150 is, for example, a liquid crystal layer or a light-emitting element layer.

For example, the pixel circuit layer 120 may include a plurality of signal lines SL and the plurality of active devices (not shown). A part of the signal lines SL are arranged along a direction X and extends in a direction Y, and another part of the signal lines SL are arranged along the direction Y and extends in the direction X. The signal lines SL intersecting each other may define a plurality of pixel regions, and a plurality of display pixels (not shown) of the display panel 100 are respectively disposed in the pixel regions. The active devices are disposed so that the display pixels respectively receive display signals through the corresponding signal lines, to individually control display gray levels of the display pixels. In this embodiment, the signal lines SL may include scan lines and data lines, but not limited thereto. In other embodiments, the signal lines SL may also include power lines, reset lines, or other signal lines suitable for a self-luminous display panel. Based on the consideration of conductivity, metal materials (e.g., molybdenum, aluminum, copper, titanium, an alloy of the above, or a combination of the above) are generally adopted for the signal lines SL.

In this embodiment, the black matrix BM disposed on the second substrate 112 overlaps the signal lines SL along the normal direction (e.g., a direction Z) of the display surface DS. The black matrix BM has a plurality of first extension segments BMa and a plurality of second extension segments BMb. The first extension segments BMa and the second extension segments BMb intersect each other and define a plurality of openings OP corresponding to the pixel regions. For example, a plurality of color filter patterns (not shown) may be disposed in the openings OP of the black matrix BM. The color filter patterns are adapted to allow different color lights to pass through to achieve color display.

To prevent light of two adjacent pixels from interfering with each other, the black matrix BM is generally made of light-shielding materials, such as black resin materials, metals, or other suitable light-shielding materials. Since the signal lines SL of this embodiment are completely shielded by the black matrix BM in the line of sight direction (e.g., a reverse direction to the direction Z), the light shielding structure layer of the display panel 100 is defined only by the black matrix BM. Nonetheless, the disclosure is not limited thereto. According to other embodiments, the black matrix of the display panel covers only part of the signal lines SL. Therefore, a part of the light shielding structure layer is defined by part of the signal lines SL that is not covered by the black matrix. In other words, the light shielding structure layer of the display panel may be defined by the signal lines SL, the black matrix, or a combination of the above.

In addition, the touch sensing layer 200 of the embodiment may include two metal conductive layers and an insulating layer 210 disposed between the two metal conductive layers. The two metal conductive layers are respectively provided with a plurality of touch electrodes of the touch sensing layer 200. For example, one of the two metal conductive layers has a plurality of first touch electrodes TE1, and the other has a plurality of second touch electrodes TE2. The first touch electrodes TE1 are arranged along the direction Y and extend in the direction X. The second touch electrodes TE2 are arranged along the direction X and extend in the direction Y (as shown in FIG. 1). Based on the consideration of conductivity, metal materials are adopted for the touch electrodes of this embodiment. To reduce light energy loss caused when the light emitted by the display panel 100 is blocked by the opaque touch electrodes, the touch electrodes made of metal materials mostly have a mesh-shaped configuration in the line of sight direction (as shown in FIG. 2).

More specifically, the touch sensing layer 200 of this embodiment has a double metal mesh structure, but not limited thereto. In other embodiments, the touch sensing layer may also be a single metal mesh structure. That is, the first touch electrodes TE1 and second touch electrodes TE2 may also be selectively manufactured in the same metal conductive layer. Moreover, at the intersection between the two touch electrodes TE1 and TE2, one of the touch electrodes TE1 and TE2 is crossed over the other one of the touch electrodes TE1 and TE2 by bridging. To increase the resistance of the touch sensing layer 200 to touch operations, the touch sensing layer 200 may further include a protective layer 220 covering the touch electrodes.

With reference to FIG. 2 and FIG. 3, in this embodiment, the first touch electrode TE1 has a plurality of wire segments TE1a and a plurality of wire segments TE1b that intersect each other. The wire segments TE1a are arranged along a direction Y' and extend in a direction X'. The wire segments TE1b are arranged along the direction X' and extend in the direction Y'. Similarly, the second touch electrode TE2 has a plurality of wire segments TE2a and a plurality of wire segments TE2b that intersect each other. The wire segments TE2a are arranged along the direction Y' and extend in the direction X'. The wire segments TE2b are arranged along the direction X' and extend in the direction Y'.

Since the touch electrodes of this embodiment are made of metal materials, a light-shielding effect similar to that of the light shielding structure layer (e.g., the black matrix BM) of the display panel 100 may be generated. As such, in the line of sight direction (e.g., a reverse direction to the direction Z), moiré patterns may be likely to be generated by the light shielding structure layer of the display panel 100 and the touch electrodes of the touch sensing layer 200 since both of them have a periodically arranged structure. For example, in this embodiment, a line width (e.g., a line width W1 and a line width W2) of the wire segments (e.g., the wire segment TE1a, the wire segment TE1b, the wire segment TE2a, and the wire segment TE2b) of the touch electrodes is greater than 4 micrometers (μm).

For a preliminary avoidance of relatively severe moiré patterns, in this embodiment, the wire segments of the touch electrodes are neither parallel nor perpendicular to the first extension segment BMa or the second extension segment BMb of the black matrix BM of the display panel 100. For example, in this embodiment, an angle α1 between the wire segment TE1a of the first touch electrode TE1 and the first extension segment BMa of the black matrix BM and an angle α2 between the wire segment TE2a of the second touch electrode TE2 and the first extension segment BMa of the black matrix BM are both in the range between 25 degrees to 65 degrees. Similarly, an angle β1 between the wire segment TE1b of the first touch electrode TE1 and the second extension segment BMb of the black matrix BM and an angle β2 between the wire segment TE2b of the second touch electrode TE2 and the second extension segment BMb of the black matrix BM are both in the range between 25 degrees to 65 degrees.

It should be noted that, at the intersection (or overlap) between the first touch electrode TE1 and the second touch electrode TE2, the wire segments TE1a of the first touch electrode TE1 and the wire segments TE2a of the second touch electrode TE2 are alternately arranged at a spacing SP1a along the direction Y', and the wire segments TE1b of the first touch electrode TE1 and the wire segments TE2b of the second touch electrode TE2 are alternately arranged at a spacing SP2a along the direction X'. Here, the spacing between any two adjacent wire segments refers to the shortest distance between the two wire segments.

By setting the spacing SP1a between the adjacent wire segments TE1a and wire segment TE2a arranged along the direction Y' and the spacing SP2a between the adjacent wire segments TE1b and wire segment TE2b arranged along the direction X' in the range of $$0.98 \times \left(\frac{25400}{PPI \times (B/N)}\right) \text{ to } 1.02 \times \left(\frac{25400}{PPI \times (B/N)}\right),$$

occurrences of moiré patterns when the touch electrodes overlap the display panel can be effectively suppressed, thereby improving the display quality of the touch display apparatus 10. Here, PPI is the number of pixels per inch of the display panel 100, B is 1.80 or 2.10, and N is 1 or a positive even number. B/N may be, for example but not limited to, 2.10, 1.80, 1.05, 0.90, 0.525, or 0.45. In a preferred embodiment, N may be a positive even number less than or equal to 10. In a most preferred embodiment, N may be a positive even number less than or equal to 6.

In this embodiment, PPI of the display panel 100 is, for example, 52.1. Therefore, when the spacing (e.g., the spacing SP1a and the spacing SP2a) between any two adjacent wire segments of the touch electrodes is set between 227.5 μm and 236.8 μm, between 265.4 μm and 276.3 μm, between 455 μm and 473.6 μm, between 530.8 μm and 552.5 μm, between 901.4 μm and 938.2 μm, or between 1061.7 μm and 1105 μm, the visibility of moiré patterns can be significantly reduced (as shown in FIG. 4). In particular, when PPI of the display panel is increased by an even multiple to 104.2, the spacing between any two adjacent wire segments of the touch electrodes may also be set between 227.5 μm and 236.8 μm, between 265.4 μm and 276.3 μm, or between 455 μm and 473.6 μm to reduce the visibility of moiré patterns (as shown in FIG. 5).

With reference to FIG. 1 together, to reduce the visibility of moiré patterns, a plurality of dummy electrodes may also be selectively disposed between any two adjacent touch electrodes. For example, the plurality of first touch electrodes TE1 and a plurality of first dummy electrodes DE1 are alternately arranged along the direction Y and are electrically insulated from each other. The plurality of second touch electrodes TE2 and a plurality of second dummy electrodes DE2 are alternately arranged along the direction X and are electrically insulated from each other. In this embodiment, the first dummy electrodes DE1 and the first touch electrodes TE1 belong to the same conductive metal layer, and the second dummy electrodes DE2 and the second touch electrodes TE2 belong to the same conductive metal layer, but not limited thereto.

To increase light transmittance, the dummy electrodes may also have a mesh-shaped configuration. In particular, the mesh-shaped structures of the touch electrodes and the dummy electrodes may be manufactured in the same lithographic etching process. Moreover, electrical independence between the touch electrodes and the dummy electrodes may be ensured by disposing a plurality of breaks (shown in FIG. 2).

In this embodiment, the first dummy electrode DE1 has a plurality of dummy wire segments DE1a and a plurality of dummy wire segments DE1b that intersect each other. The dummy wire segments DE1a are arranged along the direction Y' and extend in the direction X'. The dummy wire segments DE1b are arranged along the direction X' and extend in the direction Y'. The second dummy electrode DE2 has a plurality of dummy wire segments DE2a and a plurality of dummy wire segments DE2b that intersect each other. The dummy wire segments DE2a are arranged along the direction Y' and extend in the direction X'. The dummy wire segments DE2b are arranged along the direction X' and extend in the direction Y'.

It should be noted that, at the intersection (or overlap) between the first dummy electrode DE1 and the second touch electrode TE2, the dummy wire segments DE1a of the first dummy electrode DE1 and the wire segments TE2a of the second touch electrode TE2 are alternately arranged at a spacing SP1b along the direction Y', and the dummy wire segments DE1b of the first dummy electrode DE1 and the wire segments TE2b of the second touch electrode TE2 are alternately arranged at a spacing SP2b along the direction X'. Similarly, at the intersection (or overlap) between the second dummy electrode DE2 and the first touch electrode TE1, the dummy wire segments DE2a of the second dummy electrode DE2 and the wire segments TE1a of the first touch electrode TE1 are alternately arranged at a spacing SP1c along the direction Y', and the dummy wire segments DE2b of the second dummy electrode DE2 and the wire segments TE1b of the first touch electrode TE1 are alternately arranged at a spacing SP2c along the direction X'.

In addition, at the overlap between the first dummy electrode DE1 and the second dummy electrode DE2, the dummy wire segments DE1a of the first dummy electrode DE1 and the dummy wire segments DE2a of the second dummy electrode DE2 are alternately arranged at a spacing SP1d along the direction Y', and the dummy wire segments DE1b of the first dummy electrode DE1 and the dummy wire segments DE2b of the second dummy electrode DE2 are alternately arranged at a spacing SP2d along the direction X'.

In this embodiment, the spacing SP1a, the spacing SP2a, the spacing SP1b, the spacing SP2b, the spacing SP1c, the spacing SP2c, the spacing SP1d, and the spacing SP2d may be selectively the same. Therefore, when these spacings are each set between 227.5 μm and 236.8 μm, between 265.4 μm and 276.3 μm, between 455 μm and 473.6 μm, between 530.8 μm and 552.5 μm, between 901.4 μm and 938.2 μm, or between 1061.7 μm and 1105 μm, the visibility of moiré patterns generated by the touch electrodes, the dummy electrodes, and the light shielding structure layer of the display panel in the line of sight direction can be significantly reduced.

With reference to FIG. 3. In this embodiment, the black matrix BM (i.e., the light shielding structure layer) and the touch sensing layer 200 are respectively located on opposite sides (i.e., a first side and a second side) of the second substrate 112. Since the second substrate 112 has a certain thickness t (e.g., 0.5 mm) along the normal direction (i.e., the direction Z) of the display surface DS, when a user USR views the touch display apparatus 10 at a relatively great side viewing angle and a relatively short viewing distance, the visibility of moiré patterns of the touch display apparatus 10 may increase. This results from that the thickness t of the second substrate 112 may cause the arrangement spacing between the wire segments of the touch electrode at a relatively great side viewing angle and a relatively short viewing distance to be different from the arrangement spacing in the front view because of refraction by the second substrate 112.

For example, when the user USR views the touch display apparatus 10 at a relatively great viewing angle θ1 and a relatively short viewing distance D, the refraction of light by the second substrate 112 may causes the actual spacing (e.g., the spacing SP1a and the spacing SP2a) between any two adjacent wire segments of the touch electrodes to be visually formed into a relatively great spacing (e.g., a spacing SP1a' and a spacing SP2a') on the side of the second substrate 112 where the black matrix BM is disposed. The difference between the visual spacing and the actual spacing comes from the difference in the optical path deviation amount generated after the light is incident at different angles and passes through the second substrate 112. For example, an optical path deviation amount d1 of a light LB1 is less than an optical path deviation amount d2 of a light LB2. As a result, deterioration of moiré patterns of the touch display apparatus 10 is caused at a relatively great viewing angle and a relatively short viewing distance.

With reference to FIG. 6 together, when a viewing distance of the user is less than 50 cm, a difference between the optical path deviation amounts (i.e., d2−d1) increases as the viewing angle increases. Correspondingly, the visibility of moiré patterns gradually increases, reducing the display quality at a great viewing angles and a short viewing distance.

Therefore, to suppress the change in the visibility of moiré patterns of the touch display apparatus at different viewing angles θ1 and different viewing distances D, in the touch sensing layer of the touch display apparatus, the spacing between any two adjacent wire segments, the spacing between any two adjacent dummy wire segments, and the spacing between any adjacent wire segment and dummy wire segment may be set in the range of $$0.98 \times \left(\frac{25400}{PPI \times (B/N)} + \Delta p\right) \text{ to } 1.02 \times \left(\frac{25400}{PPI \times (B/N)} + \Delta p\right),$$

$$\text{where } \Delta p = t \times \left\{\tan\left[\sin^{-1}\left(\frac{n1 \times \sin\theta 1}{n2}\right)\right] - \tan\left[\sin^{-1}\left(\frac{n1}{n2} \times \sin\left(\tan^{-1}\left(\frac{D}{D/\tan\theta 1 + 25400/(PPI \times B/N)}\right)\right)\right)\right]\right\},$$

n1 is a refractive index of the protective layer 220, and n2 is a refractive index of the second substrate 112.

In summary of the foregoing, in the touch display apparatus according to an embodiment of the disclosure, a part of the wire segments of the touch electrodes are arranged at a specific spacing along a direction. By setting the specific spacing in the range of $$0.98 \times \left(\frac{25400}{PPI \times (B/N)}\right) \text{ to } 1.02 \times \left(\frac{25400}{PPI \times (B/N)}\right),$$

occurrences of moiré patterns when the touch electrodes overlap the display panel can be effectively suppressed, thereby improving the display quality of the touch display apparatus, where PPI is the number of pixels per inch of the display panel, B is 1.8 or 2.1, and N is 1 or a positive even number. In addition, by setting the specific spacing in the range of $$0.98 \times \left(\frac{25400}{PPI \times (B/N)} + \Delta p\right) \text{ to } 1.02 \times \left(\frac{25400}{PPI \times (B/N)} + \Delta p\right),$$

deterioration of the moiré patterns when being viewed at a great viewing angle and a short viewing distance can be improved, where Δp is a compensation value having dependence on the viewing angle and the viewing distance.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A touch display apparatus, comprising:
a display panel; and
a plurality of touch electrodes, overlapping the display panel and having a plurality of wire segments that intersect each other, wherein a first spacing SP1 between any adjacent two of the wire segments arranged along a first direction satisfies a relationship below:

$$0.98 \times \left(\frac{25400}{PPI \times (B/N)}\right) \leq SP1 \leq 1.02 \times \left(\frac{25400}{PPI \times (B/N)}\right),$$

where PPI is a number of pixels per inch of the display panel, B is 1.8 or 2.1, and N is 1 or a positive even number.

2. The touch display apparatus according to claim 1, wherein a second spacing SP2 between any adjacent two of the wire segments arranged along a second direction satisfies a relationship below:

$$0.98 \times \left(\frac{25400}{PPI \times (B/N)}\right) \leq SP2 \leq 1.02 \times \left(\frac{25400}{PPI \times (B/N)}\right),$$

where the first direction intersects the second direction.

3. The touch display apparatus according to claim 2, wherein the first spacing SP1 is equal to the second spacing SP2.

4. The touch display apparatus according to claim 1, wherein the touch electrodes comprise:
a plurality of first touch electrodes, having a plurality of first wire segments and a plurality of second wire segments that intersect each other; and
a plurality of second touch electrodes, having a plurality of third wire segments and a plurality of fourth wire segments that intersect each other, wherein the first wire segments and the third wire segments are alternately arranged at the first spacing SP1 along the first direction, the second wire segments and the fourth wire segments are alternately arranged at a second spacing SP2 along a second direction, the first direction intersects the second direction, and the second spacing SP2 satisfies a relationship below:

$$0.98 \times \left(\frac{25400}{PPI \times (B/N)}\right) \leq SP2 \leq 1.02 \times \left(\frac{25400}{PPI \times (B/N)}\right).$$

5. The touch display apparatus according to claim 1, wherein the display panel comprises a light shielding structure layer, the light shielding structure layer has a plurality of first extension segments and a plurality of second extension segments that intersect each other, and an angle between an extension direction of each of the wire segments of the touch electrodes and an extension direction of the first extension segments or an extension direction of the second extension segments is in a range between 25 degrees and 65 degrees.

6. The touch display apparatus according to claim 1, wherein a line width of each of the wire segments is greater than 4 micrometers.

7. The touch display apparatus according to claim 1, wherein B/N is equal to 2.10, 1.80, 1.05, 0.90, 0.525, or 0.45.

8. The touch display apparatus according to claim 1, further comprising:
a plurality of dummy electrodes, overlapping the display panel and electrically insulated from the touch electrodes, wherein the dummy electrodes have a plurality of dummy wire segments that intersect each other, and part of the dummy wire segments are arranged at the first spacing SP1 along the first direction.

9. A touch display apparatus, comprising:
a display panel, adapted to be viewed by a user at a viewing angle θ1 and at a viewing distance D, the display panel comprising:
a substrate, having a first side and a second side opposite to each other; and
a light shielding structure layer, disposed on the first side of the substrate;
a plurality of touch electrodes, disposed on the second side of the substrate and overlapping the light shielding structure layer, wherein the touch electrodes have a plurality of wire segments that intersect each other; and
a protective layer, disposed on the second side of the substrate and covering the touch electrodes and the substrate, wherein a first spacing SP1 between any adjacent two of the wire segments arranged along a first direction satisfies a relationship below:

$$0.98 \times \left(\frac{25400}{PPI \times (B/N)} + \Delta p\right) \leq SP1 \leq 102 \times \left(\frac{25400}{PPI \times (B/N)} + \Delta p\right),$$

$$\Delta p = t \times \left\{ \tan\left[\sin^{-1}\left(\frac{n1 \times \sin\theta1}{n2}\right)\right] - \tan\left[\sin^{-1}\left(\frac{n1}{n2} \times \sin\left(\tan^{-1}\left(\frac{D}{D/\tan\theta1 + 25400/(PPI \times B/N)}\right)\right)\right)\right] \right\},$$

where t is a thickness of the substrate, n1 is a refractive index of the protective layer, n2 is a refractive index of the substrate, PPI is a number of pixels per inch of the display panel, B is 1.8 or 2.1, and N is 1 or a positive even number.

10. The touch display apparatus according to claim 9, wherein a second spacing SP2 between any adjacent two of the wire segments arranged along a second direction satisfies a relationship below:

$$0.98 \times \left( \frac{25400}{PPI \times (B/N)} + \Delta p \right) \leq SP2 \leq 1.02 \times \left( \frac{25400}{PPI \times (B/N)} + \Delta p \right),$$

where the first direction intersects the second direction.

11. The touch display apparatus according to claim 10, wherein the first spacing SP1 is equal to the second spacing SP2.

12. The touch display apparatus according to claim 9, wherein the touch electrodes comprise:
   a plurality of first touch electrodes, having a plurality of first wire segments and a plurality of second wire segments that intersect each other; and
   a plurality of second touch electrodes, having a plurality of third wire segments and a plurality of fourth wire segments that intersect each other, wherein the first wire segments and the third wire segments are alternately arranged at the first spacing SP1 along the first direction, the second wire segments and the fourth wire segments are alternately arranged at a second spacing SP2 along a second direction, the first direction intersects the second direction, and the second spacing SP2 satisfies a relationship below:

$$0.98 \times \left( \frac{25400}{PPI \times (B/N)} + \Delta p \right) \leq SP2 \leq 1.02 \times \left( \frac{25400}{PPI \times (B/N)} + \Delta p \right).$$

13. The touch display apparatus according to claim 9, wherein the light shielding structure layer has a plurality of first extension segments and a plurality of second extension segments that intersect each other, and an angle between an extension direction of each of the wire segments of the touch electrodes and an extension direction of the first extension segments or an extension direction of the second extension segments is in a range between 25 degrees and 65 degrees.

14. The touch display apparatus according to claim 9, wherein a line width of each of the wire segments is greater than 4 micrometers.

15. The touch display apparatus according to claim 9, wherein B/N is equal to 2.10, 1.80, 1.05, 0.90, 0.525, or 0.45.

16. The touch display apparatus according to claim 9, further comprising:
   a plurality of dummy electrodes, overlapping the display panel and electrically insulated from the touch electrodes, wherein the dummy electrodes have a plurality of dummy wire segments that intersect each other, and part of the dummy wire segments are arranged at the first spacing SP1 along the first direction.

\* \* \* \* \*